United States Patent
Zhang

(12) 
(10) Patent No.: US 12,340,292 B1
(45) Date of Patent: Jun. 24, 2025

(54) METHOD AND SYSTEM FOR IMPROVING MACHINE LEARNING OPERATION BY REDUCING MACHINE LEARNING BIAS

(71) Applicant: Bank of Montreal, Toronto (CA)

(72) Inventor: Baiwu Zhang, Toronto (CA)

(73) Assignee: Bank of Montreal, Toronto (CA)

( * ) Notice: Subject to any disclaimer, the term of this patent is extended or adjusted under 35 U.S.C. 154(b) by 0 days.

(21) Appl. No.: 18/807,491

(22) Filed: Aug. 16, 2024

Related U.S. Application Data

(63) Continuation-in-part of application No. 17/492,520, filed on Oct. 1, 2021, now abandoned.

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

| | | | |
|---|---|---|---|
| 9,652,745 | B2 | 5/2017 | Taylor et al. |
| 10,033,474 | B1 | 7/2018 | Gibson et al. |
| 11,037,230 | B2 | 6/2021 | Ingerman et al. |
| 11,328,092 | B2 | 5/2022 | Barday et al. |
| 11,494,836 | B2 | 11/2022 | Cella |
| 2006/0294158 | A1 | 12/2006 | Tsyganskiy et al. |
| 2012/0215682 | A1 | 8/2012 | Lent et al. |
| 2014/0070001 | A1 | 3/2014 | Sanchez et al. |
| 2014/0222636 | A1 | 8/2014 | Cheng et al. |
| 2015/0106192 | A1 | 4/2015 | Guo et al. |
| 2015/0142713 | A1 | 5/2015 | Gopinathan et al. |
| 2015/0287138 | A1 | 10/2015 | Granbery |
| 2016/0283740 | A1 | 9/2016 | Roundtree |
| 2017/0154314 | A1 | 6/2017 | Mones et al. |
| 2017/0293858 | A1 | 10/2017 | Larsen et al. |

(Continued)

OTHER PUBLICATIONS

Avoiding prejudice in data-based decisions by Shaw (6 pages) (Year: 2015).

(Continued)

*Primary Examiner* — Daniel T Pellett
(74) *Attorney, Agent, or Firm* — Foley & Lardner LLP

(57) ABSTRACT

A network operation system and method accesses a training dataset for a network operation predictive model including historical network operation records and historical decision records, generates an inferred protected class dataset by executing a protected class demographic model, executes an algorithmic bias model using as input the historical decision records and the inferred protected class dataset to generate one or more fairness metrics, executes, based on the fairness metrics, a bias adjustment model using as input the historical decision records and the inferred protected class dataset to generate an adjusted training dataset, trains the network operation predictive model using as input the adjusted training dataset, receives an electronic request for a network operation, executes the network operation predictive model using as input at least one attribute of the electronic request for the network operation, and executes the network operation based on a prediction of the network operation predictive model.

20 Claims, 4 Drawing Sheets

(56) References Cited

U.S. PATENT DOCUMENTS

| | | | |
|---|---|---|---|
| 2017/0330058 A1* | 11/2017 | Silberman | G06N 20/00 |
| 2018/0025389 A1 | 1/2018 | Arora et al. | |
| 2019/0043070 A1 | 2/2019 | Merrill et al. | |
| 2019/0207960 A1 | 7/2019 | Chu et al. | |
| 2020/0126100 A1 | 4/2020 | Goyal et al. | |
| 2020/0167653 A1 | 5/2020 | Manjunath et al. | |
| 2020/0302309 A1 | 9/2020 | Golding | |
| 2020/0387836 A1 | 12/2020 | Nasr-Azadani et al. | |
| 2021/0357803 A1 | 11/2021 | Bhide et al. | |
| 2021/0383268 A1* | 12/2021 | Miroshnikov | G06N 20/00 |
| 2021/0406712 A1* | 12/2021 | Bhide | G06N 3/08 |
| 2022/0004923 A1 | 1/2022 | Kamkar et al. | |
| 2022/0076080 A1 | 3/2022 | Hacmon et al. | |
| 2022/0156634 A1 | 5/2022 | Margolin | |
| 2022/0171991 A1 | 6/2022 | Das et al. | |
| 2022/0343288 A1 | 10/2022 | Vadrevu et al. | |
| 2022/0414766 A1* | 12/2022 | Miroshnikov | G06Q 40/03 |
| 2023/0008904 A1 | 1/2023 | Venkataraman et al. | |
| 2024/0378508 A1* | 11/2024 | Mukhopadhyay | G06N 20/00 |

OTHER PUBLICATIONS

Fairer machine learning in the real world: Mitigating discrimination without collecting sensitive data by Veale et al (22 pages) (Year: 2017).

Fairness-Aware Classification with Prejudice Remover Regularizer by Kamishima et al (16 pages) (Year: 2012).

Final Office Action on U.S. Appl. No. 17/492,520 dated May 8, 2023 (45 pages).

Final Office Action on U.S. Appl. No. 17/492,520 dated Mar. 20, 2024 (49 pages).

Non-Final Office Action on U.S. Appl. No. 17/492,520 dated Nov. 17, 2022 (27 pages).

Non-Final Office Action on U.S. Appl. No. 17/492,520 dated Nov. 7, 2023 (45 pages).

Over-Fitting and Regularization by Nagpal (4 pages) (Year: 2017).

Regularization in Machine Learning by Gupta (11 pages) (Year: 2017).

Regularization the pat to bias-variance Trade-off by Jimoh (27 pages) (Year: 2018).

Saleiro, et al., "Aequitas: A Bias and Fairness Audit Toolkit", University of Chicago, 2018 (9 pages).

Towards Preventing Overfitting in Machine learning Regularization by Paul (10 pages) (Year: 2018).

Townson, Sian, "AI Can Make Bank Loans More Fair", Harvard Business Review, Nov. 6, 2020 (6 pages).

* cited by examiner

METHOD AND SYSTEM FOR IMPROVING MACHINE LEARNING OPERATION BY REDUCING MACHINE LEARNING BIAS

TECHNICAL FIELD

The present disclosure relates in general to computer-based methods and systems for mitigating algorithmic bias in predictive modeling, and more particularly for computer-based methods and systems for mitigating algorithmic bias.

BACKGROUND

Different entities, including institutions, retailers, and service providers, increasingly leverage machine learning models to analyze electronic consumer data and make decisions. For instance, various entities use machine learning models to customize electronic communication protocols for different users by evaluating vast amounts of data. In another example, institutions may use these models to make decisions such as fraud detection and prevention associated with different network operations. Similarly, retailers employ machine learning to optimize supply chain logistics, forecast demand, and streamline network operations. Service providers, such as telecommunications companies, utilize these models to improve network performance and reliability, estimate bandwidth requirements, and optimize resource allocation based on user data analysis.

However, the process of implementing machine learning models to evaluate data has faced significant technical challenges due to implicit bias-related issues inherent in machine learning models. These biases often stem from the data used to train the machine learning models, which may reflect historical prejudices and social inequalities. For example, if a predictive maintenance model in a manufacturing plant is trained on data that includes biased historical maintenance records, it may unfairly prioritize certain types of equipment over others, potentially leading to overlooked maintenance needs for machines that are critical but less frequently maintained. Additionally, the algorithms themselves can inadvertently reinforce these biases, leading to discriminatory outcomes that perpetuate existing disparities rather than mitigating them.

The problem is further compounded by factors outside the control of the entities using these models, such as bias in vendor-provided training data. Vendors may supply datasets that contain unrecognized biases or fail to adequately represent diverse populations, leading to skewed results. Furthermore, the complexity of machine learning models makes it challenging to identify and correct these biases, as they can be deeply embedded in the algorithms' decision-making processes. As a result, organizations must implement robust measures to detect, mitigate, and address bias, ensuring that their use of machine learning promotes fairness and equity in decision-making.

SUMMARY

There is a need for systems and methods for algorithmic decision-making in decisions whether to approve network operations that avoid or mitigate algorithmic bias against racial groups, religious groups, and other populations traditionally vulnerable to discrimination. There is a need for tools to help system developers, analysts, and other users in checking algorithmic decision making systems for fairness and bias across a variety of metrics and use cases.

The methods and systems discussed herein are directed toward technical solutions that enhance the field of machine learning by implementing advanced algorithms and methodologies designed to reduce bias, thus improving the overall fairness and accuracy of model predictions. By incorporating techniques such as bias detection and mitigation during the training phase, using more representative and diverse training datasets, and continuously monitoring model outputs for any signs of unfairness, the methods and systems discussed herein address the root causes of bias in machine learning. Additionally, the technical solutions discussed herein leverage explainable AI (XAI) to provide transparency into model decision-making processes, allowing for better identification and correction of biased outcomes. These improvements ensure that machine learning models are not only more equitable but also more reliable and robust, ultimately advancing the technical capabilities and ethical standards of the field.

Reducing bias in machine learning models enhances the functionality of the machine learning models by ensuring more accurate, fair, and reliable outcomes. When models are free from biases, they can make better-informed decisions that reflect true patterns and relationships in the data, rather than perpetuating historical prejudices or inaccuracies. This leads to improved predictive performance across diverse populations and scenarios, enhancing the model's generalizability and robustness.

The methods and systems described herein attempt to address the deficiencies of conventional systems to more efficiently and accurately analyze network operations. In an embodiment, the predictive machine learning module incorporates techniques for avoiding or mitigating algorithmic bias against racial groups, ethnic groups, and other vulnerable populations.

A network operation system and method may access a training dataset including historical network operation records, user records, and decision records. The system may generate an inferred protected class dataset based upon user profile data, such as last name or postal code. The inferred protected class dataset may include one or more of race, color, religion, national origin, gender and sexual orientation. An algorithmic bias predictive model may input the training dataset and inferred protected class dataset to determine fairness metrics for decisions whether to approve a network operation. The fairness metrics may include demographic parity and equalized odds. The system may adjust a network operation predictive model to mitigate algorithmic bias by increasing the fairness metrics for the decisions whether to approve a network operation. Measures for mitigating algorithmic bias may include removing discriminatory features, and determining a metric of disparate impact and adjusting the network operation predictive model if the metric of disparate impact exceeds a predetermined limit.

A processor-based method for generating an inferred protected class dataset based upon user profile data may input the user profile data into a protected class demographic model. The protected class demographic model may be a classifier that relates the occurrence of certain user profile data to protected class demographic groups. The model may be trained via a supervised learning method on a training data set including user profile data. The processor may execute the trained protected class demographic model to determine whether to assign each user profile data instance to protected class demographic group. The processor may execute a multiclass classifier. The multiclass classifier returns class probabilities for the protected class demographic groups. For each user profile data instance assigned by the model to a protected class demographic group, the processor may calculate a confidence score.

In an embodiment, a method comprises accessing, by a processor, a training dataset for a network operation predictive model comprising a plurality of historical network operation records and a plurality of historical decision records each representing a historical decision whether to accept a respective historical network operation, generating, by the processor, an inferred protected class dataset by executing a protected class demographic model using as input the plurality of historical network operation records, wherein the inferred protected class dataset identifies predicted demographic groups for the plurality of historical network operation records, executing, by the processor, an algorithmic bias model using as input the plurality of historical decision records and the inferred protected class dataset to generate one or more fairness metrics for the plurality of historical decision records, executing, by the processor, based on the fairness metrics, a bias adjustment model using as input the plurality of historical decision records and the inferred protected class dataset to generate an adjusted training dataset, training, by the processor, the network operation predictive model by executing the network operation predictive model using as input the adjusted training dataset, receiving, by the processor, an electronic request for a network operation, executing, by the processor, the network operation predictive model using as input at least one attribute of the electronic request for the network operation, and executing, by the processor, the network operation based on a prediction of the network operation predictive model.

In another embodiment, a system comprises a network operation predictive model, a non-transitory machine-readable memory that stores a training dataset for the network operation predictive model comprised of a plurality of historical network operation records and a plurality of historical decision records each representing a decision whether to accept a respective historical network operation, and a processor, wherein the processor in communication with the network operation predictive model and the non-transitory, machine-readable memory executes a set of instructions instructing the processor to generate an inferred protected class dataset by executing the protected class demographic model using as input the plurality of historical network operation records, wherein the inferred protected class dataset identifies predicted demographic groups for the plurality of historical network operation records, execute an algorithmic bias model using as input the plurality of historical decision records and the inferred protected class dataset to generate one or more fairness metrics for the plurality of historical decision records, execute, based on the fairness metrics, a bias adjustment model using as input the plurality of historical decision records and the inferred protected class dataset to generate an adjusted training dataset, train the network operation predictive model by executing the network operation predictive model using as input the adjusted training dataset, receive an electronic request for a network operation, execute the network operation predictive model using as input at least one attribute of the electronic request for the network operation, and execute the network operation based on a prediction of the network operation predictive model.

Numerous other aspects, features, and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
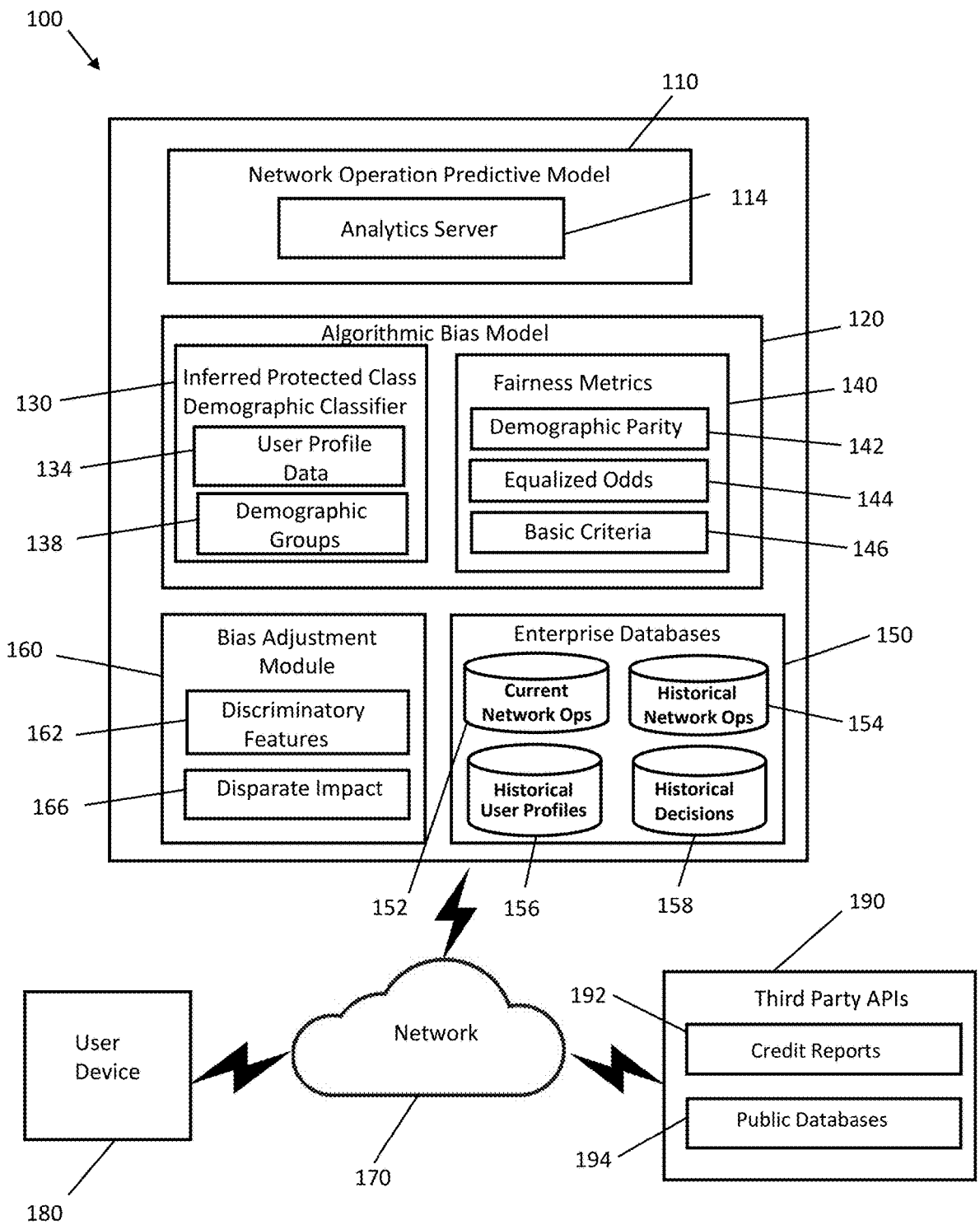
FIG. 1 is a system architecture of a system for measuring and mitigating algorithmic bias in network operation predictive model, according to an embodiment.

The present disclosure is herein described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Described herein are computer-based systems and method embodiments for detecting and reducing algorithmic bias in machine-learning decisions. Algorithmic bias may be a result of bias, hidden or overt, in training data. For example, if historical data exhibits bias against a particular demographic group, a machine-learning model trained using the historical data will exhibit the same bias against the particular demographic group. Detecting bias in training data is important to determine what algorithmic bias might be introduced during training of a machine-learning model. However, bias in training data may be hidden, as historical decisions, such as decisions as to whether to accept or reject a network operation, may be holistic decisions based on a variety of factors including a user's credit score, income, profession, and other factors. Additionally, some historical data may not include explicit identifiers of demographic information, further obscuring bias against demographic groups within the historical data. Embodiments and examples discussed herein address the problem of algorithmic bias by generating an inferred protected class dataset to predict demographic identifiers for historical network operation data. By predicting demographic identifiers, bias towards particular demographics can be identified and mitigated. The inferred protected class dataset is used to determine fairness metrics for the historical network operation data, which indicate how fairly a network operation predictive model would select (approve or reject) network operations if it were trained using the historical network operation data. Based on the fairness metrics, the historical network operation data can be adjusted to increase the fairness metrics and reduce bias. By training the network operation predictive model on the adjusted historical network operation data, an algorithmic bias of the network operation predictive model can be reduced.

The same approach can be used to further improve the network operation predictive model and reduce its algorithmic bias. An inferred protected class dataset can be generated based on decisions made by the network operation predictive model to predict demographic identifiers for network operations evaluated by the network operation predictive model. Fairness metrics for the decisions made by the network operation predictive model can be calculated to determine a fairness of the decisions and a fairness of the network operation predictive model. Based on the fairness metrics, the network operation predictive model can be further trained to increase the fairness of the network operation predictive model. Further training of the network operation predictive model can include training the network operation predictive model using data including correct decisions of the network operation predictive model labeled as correct, and incorrect decisions of the network operation predictive model labeled as incorrect. In this way, the network operation predictive model can learn from its correct (fair, unbiased) decisions as well as its incorrect (unfair, biased) decisions.

A network operation selection system accesses a training dataset including historical network operation records, user records, and decision records. The system generates an inferred protected class dataset based upon user profile data, such as last name or postal code. The inferred protected class dataset may include one or more of race, color, religion, national origin, gender and sexual orientation. An algorithmic bias model inputs the training dataset and inferred protected class dataset to determine fairness metrics for decisions whether to approve a network operation. The fairness metrics may include demographic parity and equalized odds. The system adjusts a network operation predictive model in order to mitigate algorithmic bias by increasing fairness metrics for a decision whether to approve a network operation. Techniques for mitigating algorithmic bias may include removing discriminatory features during model training. Techniques for mitigating algorithmic bias may include determining a metric of disparate impact, and adjusting the network operation predictive model if the metric of disparate impact exceeds a predetermined limit during measurement of model performance.

Attributes of users can include or correlate to protected class attributes and can form the basis for unintentional algorithmic bias. As will be further described in this disclosure, computer-based systems and method embodiments that model various metrics for network operation approval are designed to avoid or mitigate algorithmic bias that can be triggered by such attributes. In an embodiment, model creation and training incorporates measures to ensure that user attributes are applied to provide realistic outcomes that are not tainted by unintentional bias relating to a protected class of the users.

Since information about membership of users in these demographic groups (protected classes) is generally not available in user profile data, disclosed embodiments determine inferred protected classes from other user attributes. These inferred demographic groups are applied to mitigate algorithmic bias that can be triggered by such attributes. Herein, attributes such as race, color, religion, national origin, gender and sexual orientation are sometimes referred to as protected class attributes.

FIG. 1 shows a system architecture for a network operation system 100 incorporating a network operation predictive model, also herein called approval system 100. Network operation system 100 may be hosted on one or more computers (or servers), and the one or more computers may include or be communicatively coupled to one or more databases. Network operation system 100 can effect predictive modeling of eligibility factors of users. Attributes of users can include or correlate to protected class attributes and can form the basis for unintentional algorithmic bias. Network operation system 100 incorporates an algorithmic bias model 120 and a bias adjustment module 160 designed to avoid or mitigate algorithmic bias that can be triggered by such attributes.

A sponsoring enterprise for network operation system 100 can be a retailer, employer, fraud prevention service provider, bank, landlord, government institution, or other institution that processes network operations. A user (customer or customer representative) can submit an electronic request for a network operation to network operation system 100 via user device 180. Electronic requests received from user device 180 may be transmitted over network 170 and stored in current network operations database 152 for processing by network operation system 100 for algorithmic review via network operation predictive model 110. In some embodiments, a user may submit a hard copy request, which may be digitized and stored in current network operations database 152.

In various embodiments, network operation predictive model 110 outputs a decision as to whether a network operation is approved (i.e., whether the user's request is approved), and in some cases as to terms of approval. In some embodiments, network operation predictive model 110 may output recommendations for review and decision by professionals of the sponsoring enterprise. In either case, modules 120, 160 may be applied to the decision-making process to mitigate algorithmic bias and improve fairness metrics. In processing an electronic request submitted via user device 180, the system 100 can generate a report for the electronic request for display on a user interface on user device 180. In an embodiment, a report can include an explanation of a decision by network operation predictive model 110, which explanation may include fairness metrics applied by the model.

The network operation predictive model 110 may generate a score as an output. The score may be compared with a threshold to classify a network operation as eligible or ineligible. In an embodiment, the score may be compared with a first threshold and a lower second threshold to classify the network operation. In this embodiment, the model 110 may classify the network operation as eligible for if the score exceeds the first threshold, may classify the network operation as ineligible if the score falls below the second threshold, and may classify the network operation for manual review if the score falls between the first and second thresholds. For certain categories of users associated with special programs, the system 100 may apply special eligibility standards in making decisions on eligibility.

Network operation predictive model 110 includes an analytical engine 114. Analytical engine 114 executes thousands of automated rules encompassing, e.g., financial attributes, demographic data, employment history, credit scores, and other user profile data collected through digital applications and through third party APIs 190. Analytical engine 114 can be executed by a server, one or more server computers, authorized client computing devices, smartphones, desktop computers, laptop computers, tablet computers, PDAs and other types of processor-controlled devices that receive, process, and/or transmit digital data.

Analytical engine 114 can be implemented using a single-processor system including one processor, or a multi-processor system including any number of suitable processors that may be employed to provide for parallel and/or sequential execution of one or more portions of the techniques described herein. Analytical engine 114 performs these operations as a result of central processing unit executing software instructions contained within a computer-readable medium, such as within memory. As used herein, a module may represent functionality (or at least a part of the functionality) performed by a server and/or a processor. For instance, different modules may represent different portion of the code executed by the analytical engine server 114 to achieve the results described herein. Therefore, a single server may perform the functionality described as being performed by separate modules.

In one embodiment, the software instructions of the system are read into memory associated with the analytical engine 114 from another memory location, such as from a storage device, or from another computing device via communication interface. In this embodiment, the software instructions contained within memory instruct the analytical engine 114 to perform processes described below. Alternatively, hardwired circuitry may be used in place of, or in combination with, software instructions to implement the processes described herein. Thus, implementations described herein are not limited to any specific combinations of hardware circuitry and software.

Enterprise databases 150 consist of various databases under custody of a sponsoring enterprise. In the embodiment of FIG. 1, enterprise databases 150 include current network operations database 152, historical network operations database 154, historical users profile data 156, and historical decisions database 158. Each record of the historical users profile database 156 may be identified with a user associated with a respective record in historical network operations database 154. In some implementations, the historical network operations database 154 includes the historical users profile data 156. In some implementations, each record of the historical network operations database 154 includes corresponding user information. Each record of the historical decisions database 158 may represent a decision whether to accept a respective historical network operation, such as a decision whether or not to approve a network operation. Enterprise databases 150 are organized collections of data, stored in non-transitory machine-readable storage. The databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, or network databases. Example database management systems include MySQL, PostgreSQL, SQLite, Microsoft SQL Server, Microsoft Access, Oracle, SAP, dBASE, FoxPro, IBM DB2, LibreOffice Base, and FileMaker Pro. Example database management systems also include NoSQL databases, i.e., non-relational or distributed databases that encompass various categories: key-value stores, document databases, wide-column databases, and graph databases.

Third party APIs 190 include various databases under custody of third parties. These databases may include credit reports 192 and public records 194 identified with the user. Credit reports 192 may include information from credit bureaus such as EXPERIAN®, FICO®, EQUIFAX®, TransUnion®, and INNOVIS®. Credit information may include credit scores such as FICO® scores. Public records 194 may include various financial and non-financial data pertinent to eligibility.

Network operation predictive model 110 may include one or more machine learning predictive models. As used herein, the phrase "predictive model" may refer to any class of algorithms that are used to understand relative factors contributing to an outcome, estimate unknown outcomes, discover trends, and/or make other estimations based on a data set of factors collected across prior trials. In an embodiment, the predictive model may refer to methods such as logistic regression, decision trees, neural networks, linear models, and/or Bayesian models. Suitable machine learning model classes include but are not limited to random forests, logistic regression methods, support vector machines, gradient tree boosting methods, nearest neighbor methods, and Bayesian regression methods. In an example, model training curated a data set of historical network operations 154, wherein the historical network operations included then-current user profile data 156 of the users and decisions 158.

An algorithmic bias model 120 includes an inferred protected class demographic classifier 130 and fairness metrics module 140. During training of network operation predictive model 110, the inferred protected class demographic classifier 130 generated an inferred protected class dataset based upon user profile data 134. The algorithmic bias model 120 applied a predictive machine learning model to a training dataset from databases 154, 156, and 158 and to the inferred protected class dataset to determine fairness metrics for decisions output by the network operation predictive model 110, fairness metrics for the training dataset, and/or fairness metrics for decisions that would be output by the network operation predictive model 110 if the network operation selection model 110 were trained using the training dataset. Bias adjustment module 160 adjusted the network operation predictive model 110 and/or the training dataset to increase the fairness metrics for the decisions output by the network operation predictive model 110 and/or the training dataset.

In some implementations, the inferred protected class demographic classifier 130 is executed using as input the training dataset to predict (infer) demographic identifiers for users in the training dataset to generate an inferred protected class dataset. The inferred protected class dataset provides insight into the demographics of users for data where demographics are not provided. The inferred protected class dataset allows for bias against demographic groups to be identified. In this example, the algorithmic bias model 120 is executed using as input the training dataset and the inferred protected class dataset to determine fairness metrics for the historical network operation decisions in the training dataset. Based on the fairness metrics, the bias adjustment module 160 can make adjustments to the network operation predictive model 110 and/or the training dataset. In some implementations, the network operation predictive model 110 is trained using the training dataset, the network operation predictive model 110 is executed to generate network operation decisions, the algorithmic bias model 120 is executed to determine fairness metrics of the network operation decisions, and the bias adjustment module 160 adjusts one or more parameters of the network operation predictive model 110 to increase a fairness of the network operation decisions made by the network operation predictive model 110. In some implementations, the bias adjustment module 160 removes discriminatory features from the training dataset. The bias adjustment module 160 may iteratively adjust the training dataset, compare fairness metrics generated by the algorithmic bias model 120 for the adjusted training dataset, and adjust the training dataset until the fairness metrics are above a predetermined threshold. In some implementations, the bias adjustment module 160 removes information from the training dataset that indicates demographics of users. In an example, the bias adjustment module 160 may remove information from the training dataset that identifies demographics until the inferred protected class demographic classifier 130 can no longer infer demographics of users. In this way, information that is correlated with bias in the training dataset can be removed, preventing this bias from becoming algorithmic bias through training of the network operation predictive model 110. In some implementations, the bias adjustment module 160 adjusts one or more historical decisions in the training dataset to improve the fairness metrics. In an example, if a historical decision is determined to be unfair in that a network operation would have been accepted but for a demographic of the user, the bias adjustment module 160 may change the historical decision to be an acceptance of the network operation.

Network operation system 100 and its components, such as network operation predictive model 110, algorithmic bias model 120, and bias adjustment module 160, can be executed by a server, one or more server computers, authorized client computing devices, smartphones, desktop computers, laptop computers, tablet computers, PDAs, and other types of processor-controlled devices that receive, process and/or transmit digital data. System 100 can be implemented using a single-processor system including one processor, or a multi-processor system including any number of suitable processors that may be employed to provide for parallel and/or sequential execution of one or more portions of the techniques described herein. In an embodiment, system 100 performs these operations as a result of the central processing unit executing software instructions contained within a computer-readable medium, such as within memory. In one embodiment, the software instructions of the system are read into memory associated with the system 100 from another memory location, such as from storage device, or from another computing device via communication interface. In this embodiment, the software instructions contained within memory instruct the system 100 to perform processes described herein. Alternatively, hardwired circuitry may be used in place of or in combination with software instructions to implement the processes described herein. Thus, implementations described herein are not limited to any specific combinations of hardware circuitry and software.

Inferred protected class demographic classifier 130 is configured to generate an inferred protected class dataset based upon user profile data 134. In an embodiment, during training phase the inferred protected class dataset identifies a demographic group 138 associated with a plurality of user profile records in historical user profile database 156. In various embodiments, the identified demographic group includes one or more protected class attributes, e.g., one or more of race, color, religion, national origin, gender and sexual orientation. In generating the inferred protected class dataset based upon user profile data, an input variable for inferred protected class classifier 130 may include last name of a person. In generating the inferred protected class dataset based upon user profile data, an input variable for inferred protected class classifier 130 may include a postal code identified with the user.

In an embodiment, the inferred protected class demographic classifier model 130 executes a multiclass classifier. Multiclass classification may employ batch learning algorithms. In an embodiment, the multiclass classifier employs multiclass logistic regression to return class probabilities for protected class demographic groups 138. In an embodiment, the classifiers predict that a user profile data instance belongs to a protected class demographic group if the classifier outputs a probability exceeding a predetermined threshold (e.g., >0.5).

An example inferred protected class demographic classifier model 130 incorporates a random forests framework in combination with regression framework. Random forests models for classification work by fitting an ensemble of decision tree classifiers on sub samples of the data. Each tree only sees a portion of the data, drawing samples of equal size with replacement. Each tree can use only a limited number of features. By averaging the output of classification across the ensemble, the random forests model can limit overfitting that might otherwise occur in a decision tree model. The regression framework enables more efficient model development in dealing with hundreds of predictors and iterative feature selection. The predictive machine learning model can identify features that have the most pronounced impact on predicted value.

Algorithmic bias model 120 applies a machine learning model to the training dataset and the inferred protected class dataset to determine fairness metrics 140 for the decisions whether to accept the respective historical network operation records. In an embodiment, the algorithmic bias model applies a predictive machine learning model trained using features of the historical network operation records 154, the historical user profile records 156, and historical decision records 158.

In an embodiment, fairness metrics 140 include demographic parity 142. In an embodiment, demographic parity means that the proportion of each segment of a protected class receives a positive approval by model 110 at equal approval rates. Demographic parity 142 may include an approval rate and inferred protected class, ignoring other factors.

In an embodiment, fairness metrics 140 include a fairness metric for a credit score for each of the historical network operation records 152.

In an embodiment, fairness metrics 140 include equalized odds 144. As used in the present disclosure, equalized odds are satisfied if no matter whether a user is or is not a protected class, if they are qualified they are equally as likely to get approved, and if they are not qualified they are equally as likely to get rejected. Equalized odds may include an approval rate and inferred protected class for users satisfying predefined basic criteria 146 for approval. In an embodiment in which the network operation selection model outputs a decision whether to approve a network operation requested by a user, equalized odds are determined relative to users satisfying basic criteria 146 for eligibility.

Bias adjustment module 160 adjusts the network operation predictive model 110 to increase the fairness metrics for the decisions output by the network operation predictive model 110. In various embodiments, methods for developing and testing the approval system 100 incorporate the bias adjustment model 160 to mitigate algorithmic bias in predictive modeling. Mitigation measures taken prior to model training may include removing discriminatory features 162, screening features to include only features proven to correlate with target variables. In removing discriminatory features, seemingly unrelated variables can act as proxies for protected class. Biases may be present in the training data itself. Simply leaving out overt identifiers is not enough to avoid giving a model signal about race or marital status because this sensitive information may be encoded elsewhere. Measures for avoiding disparate impact include thorough examination of model variables and results, adjusting inputs and methods as needed.

In an embodiment, methods for mitigating algorithmic bias include data repair in building final datasets of the enterprise databases 150. Data repair seeks to remove the ability to predict the protected class status of an individual and can effectively remove disparate impact 166. Data repair removes systemic bias present in the data and is only applied to attributes used to make final decisions, not target variables. An illustrative data repair method repaired the data attribute by attribute. For each attribute, the method considered the distribution of the attribute, when conditioned on the users' protected class status, or proxy variable. If there was no difference in the distribution of the attribute when conditioned on the users' protected class status, the repair had no effect on the attribute.

In an embodiment, bias adjustment module 160 processes eligibility scores output by network operation predictive model 110 to determine whether a metric of disparate impact exceeds a predetermined limit of relative selection rate to other groups in network operation system 100. In an embodiment, disparate impact component 166 identifies disparate impact using the '80% rule' of the Equal Employment Opportunity Commission (EEOC). Disparate impact compares the rates of positive classification within protected groups, e.g., defined by gender or race. The '80% rule' in employment states that the rate of selection within a protected demographic should be at least 80% of the rate of selection within the unprotected demographic. The quantity of interest in such a scenario is the ratio in positive classification outcomes for a protected group Y from the rest of the population X/Y. In an embodiment, in the event disparate impact component 166 determines that a metric of disparate impact exceeds the predetermined limit, bias adjustment module 160 sends a notification of this bias determination to enterprise users and adjusts the network operation predictive model 110 to improve this fairness metric.

Figure 2:
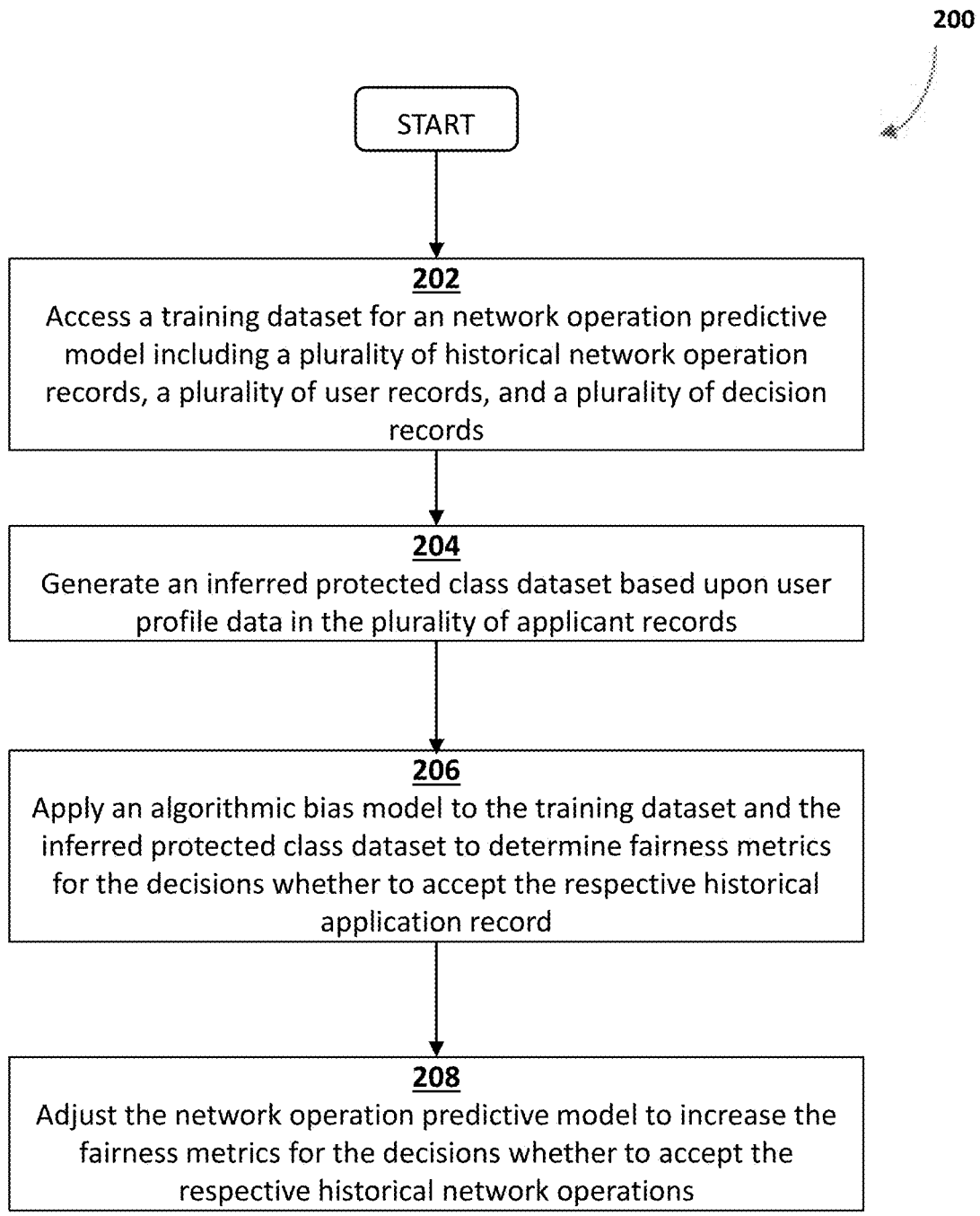
FIG. 2 is a flow chart of a procedure for measuring and mitigating algorithmic bias in a network operation predictive model, according to an embodiment.

FIG. 2 illustrates a flow diagram of a procedure for measuring and mitigating algorithmic bias in a network operation predictive model. The method 200 may include steps 202-208. However, other embodiments may include additional or alternative steps, or may omit one or more steps altogether.

The method 200 is described as being executed by a processor, such as the analytics server 114 described in FIG. 1. The analytics server may employ one or more processing units, including but not limited to CPUs, GPUs, or TPUs, to perform one or more steps of method 200. The CPUs, GPUs, and/or TPUs may be employed in part by the analytics server and in part by one or more other servers and/or computing devices. The servers and/or computing devices employing the processing units may be local and/or remote (or some combination). For example, one or more virtual machines in a cloud may employ one or more processing units, or a hybrid processing unit implementation, to perform one or more steps of method 200. However, one or more steps of method 200 may be executed by any number of computing devices operating in the distributed computing system described in FIG. 1. For instance, one or more computing devices may locally perform part or all of the steps described in FIG. 2.

In step 202, the processor accesses a training dataset for a network operation predictive model including a plurality of historical network operation records, a plurality of user records, and a plurality of decision records. Each of the plurality of user records may be identified with user associated with a respective historical network operation record. Each of the plurality of decision records may represent a decision whether to accept a respective historical network operation.

In an embodiment of step 202, the network operation predictive model is configured to output a decision whether to approve a network operation of a user (e.g., whether to a network operation requested by the user). in some implementations, the decision whether to accept the respective historical network operation may include a decision whether to employ the user, rent lodgings to the user, extend credit to the user, or issue a government identification to the user.

In step 204, the processor generates an inferred protected class dataset based upon user profile data in the plurality of user records. In an embodiment, the inferred protected class dataset identifies a demographic group associated with each of the plurality of user records. In various embodiments, the identified demographic group includes one or more of race, color, religion, national origin, gender and sexual orientation.

In an embodiment of step 204, in generating the inferred protected class dataset based upon user profile data, the user profile data may include last name of a person. In generating the inferred protected class dataset based upon user profile data, the user profile data may include a postal code identified with the user.

In step 206, the processor applies an algorithmic bias model to the training dataset and the inferred protected class dataset to determine fairness metrics for the decisions whether to accept the respective historical network operations. In an embodiment of step 206, the algorithmic bias model applies a predictive machine learning model trained using features of the historical network operation records and the user records.

In an embodiment of step 206, the fairness metrics for the decision whether to accept the respective historical network operations include demographic parity. In an embodiment, demographic parity means that the proportion of each segment of a protected class receives a positive decision at equal approval rates. Demographic parity 142 may include an approval rate and inferred protected class, ignoring other factors.

The fairness metrics for the decision may include a fairness metric for a credit score for each of the users of the respective historical network operation records.

In step 206 the fairness metrics for the decision may include equalized odds. Equalized odds is satisfied provided that no matter whether a user is a protected class or is not in a protected class, if they are qualified, they are equally as likely to get approved, and if they are not qualified, they are equally as likely to get rejected. Equalized odds may include an approval rate and inferred protected class for users satisfying predefined basic criteria for approval. In an embodiment in which the network operation model outputs a decision whether to approve a network operation of a user, equalized odds are determined relative to users satisfying basic criteria for eligibility.

In step 208, the processor adjusts the network operation predictive model to increase the fairness metrics for the decisions whether to accept the respective historical network operations. Step 208 may adjust the network operation predictive model via data repair in building final training datasets for the network operation predictive model. In an embodiment in which the algorithmic bias model applies a predictive machine learning model trained using features of the historical network operation records and the user records, step 208 may adjust the network operation predictive model via one or more of removing discriminatory features and screening features to include only features proven to correlate with target variables.

In an embodiment of step 208, during training of the network operation predictive model, a model training procedure incorporates regularization to improve one or more fairness metrics in the trained model.

In an embodiment, the fairness metrics for the decisions whether to accept the respective historical network operations include metrics of disparate impact. In an embodiment, step 206 determines a metric of disparate impact, and step 208 adjusts the network operation predictive model if the metric of disparate impact exceeds a predetermined limit during measurement of model performance. In an embodiment, measures for mitigating algorithmic bias taken after model training include performance testing to test whether the model exhibits disparate impact.

Figure 3:
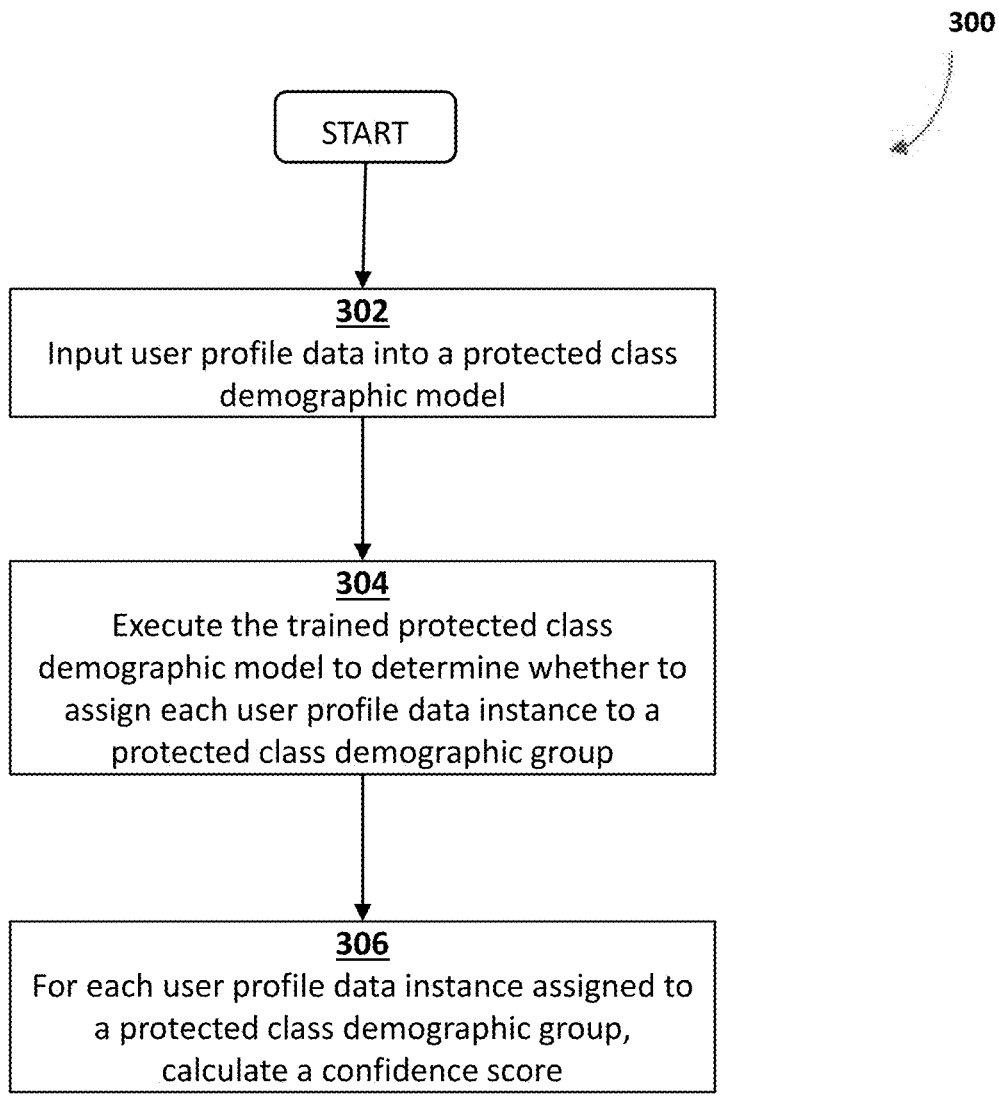
FIG. 3 is a flow chart of a procedure for generating an inferred protected class dataset based upon user profile data, according to an embodiment.

FIG. 3 illustrates a flow diagram of a processor-based method for generating an inferred protected class dataset based upon user profile data. The method 300 may include steps 302-306. However, other embodiments may include additional or alternative steps, or may omit one or more steps altogether.

At step 302, the processor inputs user profile data into a protected class demographic model. In an embodiment, the protected class demographic model is a classifier that relates the occurrence of certain user profile data to protected class demographic groups. In an embodiment, the protected class demographic model is a statistical machine learning predictive model. In an embodiment, the predictive model may refer to methods such as logistic regression, decision trees, neural networks, linear models, and/or Bayesian models.

In an embodiment, the model is trained via a supervised learning method on a training data set including user profile data. In an embodiment, the training data set includes pairs of an explanatory variable and an outcome variable, wherein the explanatory variable is a demographic feature from the user profile dataset, and the outcome variable is a protected class demographic group. In an embodiment, model fitting includes variable selection from the user profile dataset. The fitted model may be applied to predict the responses for the observations in a validation data set. In an embodiment, the validation dataset may be used for regularization to avoid over-fitting in the trained dataset.

At step 304, the processor executes the trained protected class demographic model to determine whether to assign each user profile data instance to protected class demographic group. In an embodiment of step 304, the processor executed a multiclass classifier. In an embodiment, multiclass classification employs batch learning algorithms. In an embodiment, the multiclass classifier employs multiclass logistic regression to return class probabilities for the protected class demographic groups. In an embodiment, the classifiers predict that a user profile data instance belongs to a protected class demographic group if the classifier outputs a probability exceeding a predetermined threshold (e.g., >0.5), At step 306, for each user profile data instance assigned by the model to a protected class demographic group, the processor calculates a confidence score. In an embodiment, the protected class demographic model is multiclass classifier that returns class probabilities for the protected class demographic groups, and the confidence score is derived from the class probability for each user profile data instance assigned to a protected class demographic group.

Figure 4:
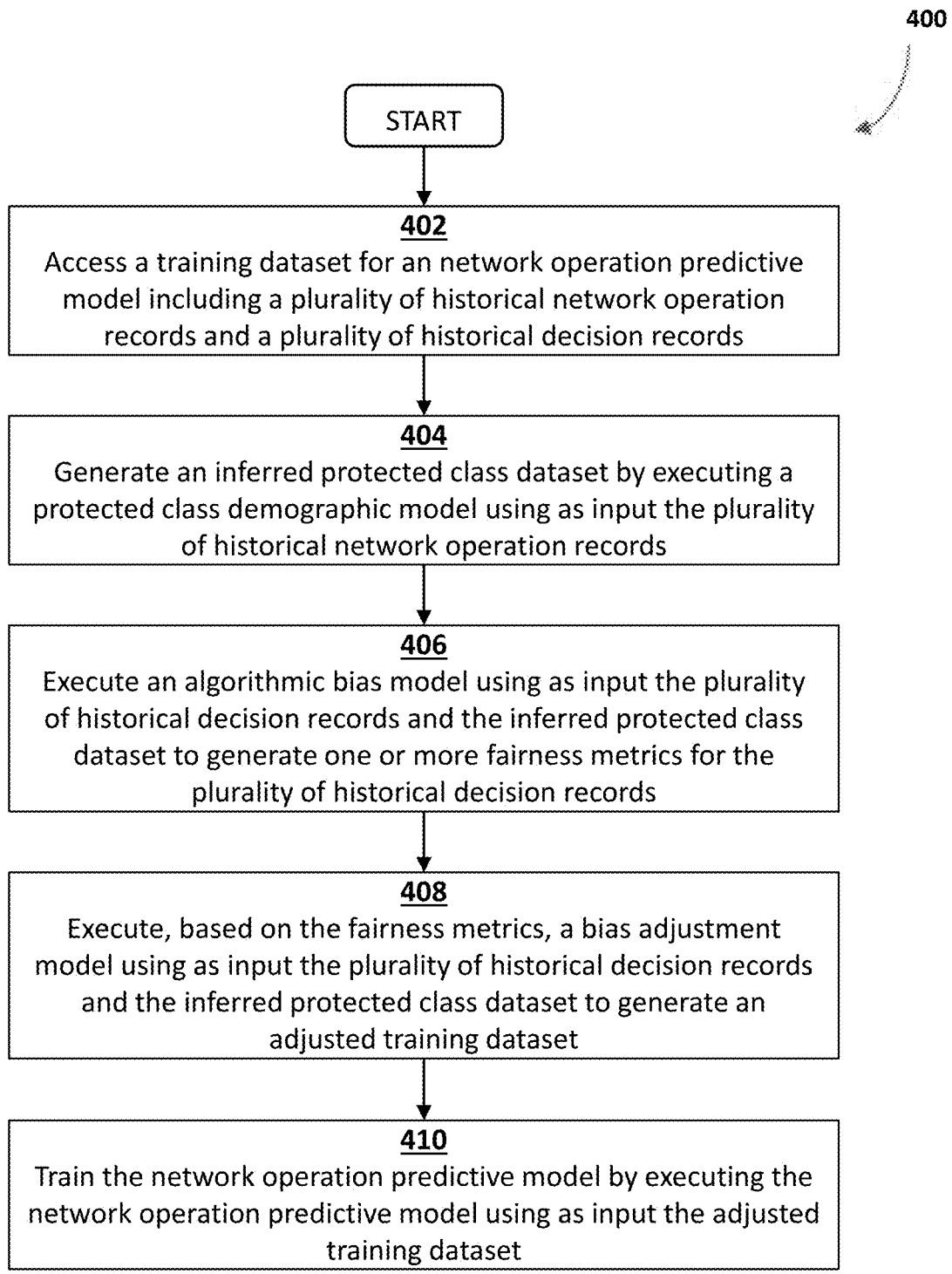
FIG. 4 is a flow chart of a procedure for measuring and mitigating algorithmic bias in a network operation predictive model, according to an embodiment.

FIG. 4 illustrates a flow diagram of a procedure for measuring and mitigating algorithmic bias in a network operation predictive model. The method 400 may include steps 402-410. However, other embodiments may include additional or alternative steps, or may omit one or more steps altogether.

The method 400 is described as being executed by a processor, such as the analytics server 114 described in FIG. 1. The analytics server may employ one or more processing units, including but not limited to CPUs, GPUs, or TPUs, to perform one or more steps of method 400. The CPUs, GPUs, and/or TPUs may be employed in part by the analytics server and in part by one or more other servers and/or computing devices. The servers and/or computing devices employing the processing units may be local and/or remote (or some combination). For example, one or more virtual machines in a cloud may employ one or more processing units, or a hybrid processing unit implementation, to perform one or more steps of method 400. However, one or more steps of method 400 may be executed by any number of computing devices operating in the distributed computing system described in FIG. 1. For instance, one or more computing devices may locally perform part or all of the steps described in FIG. 4.

In step 402, the processor accesses a training dataset for a network operation predictive model including a plurality of historical network operation records and a plurality of historical decision records. The plurality of historical network operation records may include user information, or user records of corresponding users. Each of the plurality of historical decision records may represent a decision whether to accept a respective historical network operation. The plurality of historical network operation records and the plurality of historical decision records may be retrieved from one or more databases, such as the enterprise databases 150 of FIG. 1. The network operation predictive model may be configured to output a decision whether to approve a network operation of a user. The network operation predictive model may be trained, via the method 400 to make decisions whether to accept users without considering demographic attributes and/or to make decisions that comply with fairness metrics.

In step 404, the processor generates an inferred protected class dataset by executing a protected class demographic model using as input the plurality of historical network operation records. In an embodiment, the inferred protected class dataset identifies a demographic group associated with each of the plurality of historical network operation records. In various embodiments, the identified demographic group includes one or more of race, color, religion, national origin, gender and sexual orientation.

In some implementations, the method 400 includes removing, from the training dataset, overt identifiers of demographic information prior to generating the inferred protected class dataset. In this way, an accuracy of the inferred protected class dataset can be determined for updating the protected class demographic model. In some implementations, the method 400 includes training the protected class demographic model by comparing an output of the protected class demographic model to actual demographic information. In an example, the protected class demographic model is executed using as input network operation information to generate inferred demographics for the network operation information and the inferred demographics are compared to actual (ground truth) demographics for the network operation information to determine an accuracy of the protected class demographic model. In this example, the protected class demographic model can be iteratively updated until an error between the inferred demographics and the actual demographics is below a predetermined error threshold.

In step 406, the processor executes an algorithmic bias model using as input the plurality of historical decision records and the inferred protected class dataset to generate one or more fairness metrics for the plurality of historical decision records. In an embodiment, the fairness metrics include demographic parity. In an embodiment, demographic parity means that each demographic in a population receives a positive decision at equal approval rates. Demographic parity may include an approval rate and inferred protected class, ignoring other factors. The fairness metrics for the decision may include a fairness metric for a credit score for each of the users of the respective historical network operation records. The fairness metric for the credit score may indicate whether the corresponding network operation would be expected to be accepted based on the credit score alone, ignoring other factors. This credit score fairness metric may identify bias based on prohibited characteristics by focusing on characteristics correlated with target outcomes, such as successful repayment of credit. Other fairness metrics may focus on other characteristics, such as income, credit history, or other characteristics correlated with successful repayment of debt.

In step 406 the fairness metrics for the decision may include equalized odds. Equalized odds are satisfied provided that no matter whether a user is a protected class or is not in a protected class, if they are qualified, they are equally as likely to get approved, and if they are not qualified, they are equally as likely to get rejected. Equalized odds may include an approval rate and inferred protected class for users satisfying predefined basic criteria for approval.

In step 408, the processor executes a bias adjustment model using as input the plurality of historical decision records and the inferred protected class dataset to generate an adjusted training dataset. Step 408 may adjust the network operation predictive model by one or more of removing discriminatory features from the training dataset. In some implementations, removing discriminatory features includes screening features in the training dataset to include only features proven to correlate with target variables in the adjusted training set. In an example, the bias adjustment model removes user addresses from the training dataset based on the fairness metrics indicating that demographics are inferred at least in part based on address. In an example, the bias adjustment model removes all user information except for characteristics that correlate with target variables, such as credit score, credit history, and income.

In an embodiment, the fairness metrics include metrics of disparate impact. In an embodiment, step 406 determines a metric of disparate impact, and step 408 adjusts the network operation predictive model if the metric of disparate impact exceeds a predetermined limit during measurement of model performance. In an embodiment, measures for mitigating algorithmic bias taken after model training include performance testing to test whether the model exhibits disparate impact.

In step 410, the processor trains the network operation predictive model by executing the network operation predictive model using as input the adjusted training dataset. In some implementations, training the network operation predictive model includes executing the network operation predictive model to generate predicted network operation decisions, comparing the predicted network operation decisions to actual (ground truth) network operation decisions, and updating the network operation predictive model to reduce an error between the predicted network operation decisions and the actual network operation decisions.

In some implementations, the method 400 includes evaluating a fairness of the network operation predictive model and updating the network operation predictive model to increase the fairness of the network operation predictive model. In some implementations, the method 400 can be combined with the method 200 of FIG. 2. In an example, the network operation predictive model is initially trained by generating fairness metrics for the training dataset and then further trained by generating fairness metrics for decisions generated by the network operation predictive model.

In some implementations, the method 400 includes generating a second set of decision records by executing the network operation predictive model using as input a second set of network operation records, generating a second inferred protected class dataset by executing the protected class demographic model using as input the second set of network operation records, executing, by the processor, the algorithmic bias model on the second set of decision records and the second inferred protected class dataset to generate one or more second fairness metrics for the second set of decision records, executing, by the processor, based on the one or more second fairness metrics, the bias adjustment model using as input the second set of decision records and the second inferred protected class dataset to generate a second adjusted training dataset, and training the network operation predictive model using as input the second adjusted training dataset.

In some implementations, the second adjusted training dataset includes one or more decision records of the second set of decision records having a fairness metric below a predetermined threshold. These decision records may be unacceptably unfair, or biased, and may be included in the second adjusted training dataset as a negative example to train the network operation predictive model to not make similar decisions. Including these negative examples in the second adjusted training dataset may allow the network operation predictive model to learn from specific instances of bias such that the network operation predictive model has a robust training to avoid making biased decisions. In an example, algorithmic bias may be hidden such that the bias is only expressed in specific circumstances. By identifying decisions that meet these specific circumstances, resulting in bias, the network operation predictive model can be trained to remove the algorithmic bias expressed in the specific circumstances. In some implementations, generating the second adjusted training dataset includes adjusting, based on the one or more second fairness metrics, one or more decision records of the second set of decision records. In this way, the second adjusted training dataset can be generated to correct incorrect decisions made by the network operation predictive model to train the network operation predictive model to make more accurate decisions. In some implementations, the second adjusted training dataset can include the incorrect decision as a negative example of an incorrect decision and/or the corrected decision as a positive example.

In this way, the network operation predictive model can be iteratively trained, or updated based on the fairness of the network operation predictive model as reflected in the current fairness metrics generated by the algorithmic bias model. In this way, the network operation predictive model can learn from its correct (unbiased, fair) decisions as well as its incorrect (biased, unfair) decisions.

In some implementations, the method 400 includes executing the network operation predictive model using as input a network operation to approve or reject the network operation. In this way, network operations can be automatically (without human input) approved or rejected by the network operation predictive model. In some implementations, the network operation predictive model generates a score for the network operation which is used in a larger review process. In some implementations, the network operation predictive model refers network operations for human review with recommendations for approval or rejection.

In some implementations, the method 400 includes receiving an electronic request for a network operation. The network operation may be received from a user device associated with a user. The method 400 may include executing the network operation predictive model using as input at least one attribute of the electronic request for the network operation. The network operation predictive model, trained to reduce algorithmic bias, may generate a prediction based on factors correlated with target factors and not based on improper demographic biases. In this way, the network operation predictive model can accept or reject requested network operations without algorithmic bias. The method 400 can include executing the network operation based on the prediction of the network operation predictive model. In an example, the network operation predictive model is a model used for rendering decisions on whether to accept or reject applications, such as applications for credit. The network operation predictive model can be trained using a training dataset including historical applications and historical application decisions for the historical applications. However, the historical application decisions may include biases based on the historical applications, such as demographics of users who submitted the historical applications. Thus, to reduce algorithmic bias of the network operation predictive model, an inferred protected class dataset is generated by executing a protected class demographic model using as input the historical applications. The inferred protected class dataset includes a demographic prediction for each user who submitted the historical applications. Bias in the historical application decisions is detected by executing an algorithmic bias model using as input the historical application decisions and the inferred protected class dataset to generate fairness records indicating a fairness of the historical application decisions. Based on the fairness metrics, a bias adjustment model is executed using as input the historical application decisions and the inferred protected class dataset to generate an adjusted training dataset. By training the network operation predictive model using the adjusted training dataset, an algorithmic bias of the network operation predictive model is reduced. Thus, the network operation predictive model can be executed to accept or reject applications in a fair, unbiased manner. Applications, such as applications for credit, can be accepted or rejected based on the decisions of the network operation predictive model.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method of improving efficiency of a machine learning model by reducing bias in the machine learning model via iterative training, the method comprising:
   accessing, by a processor, a training dataset for a network operation predictive model comprising a plurality of historical network operation records and a plurality of historical decision records each representing a historical decision whether to accept a respective historical network operation;
   generating, by the processor, an inferred protected class dataset by executing a protected class demographic model using as input the plurality of historical network operation records, wherein the inferred protected class dataset identifies predicted demographic groups for the plurality of historical network operation records;
   executing, by the processor, an algorithmic bias model using as input the plurality of historical decision records and the inferred protected class dataset to generate one or more first fairness metrics for the plurality of historical decision records;
   executing, by the processor, based on the one or more first fairness metrics, a bias adjustment model using as input the plurality of historical decision records and the inferred protected class dataset to generate an adjusted training dataset, wherein the adjusted training dataset includes only features correlated with target variables;
   training, by the processor, the network operation predictive model by executing the network operation predictive model using as input the adjusted training dataset;
   executing, by the processor, the network operation predictive model using as input a plurality of network operation records to generate a plurality of decision records;
   executing, by the processor, the algorithmic bias model using as input the plurality of decision records to generate one or more second fairness metrics for the plurality of decision records generated by the network operation predictive model;
   executing, by the processor, based on the one or more second fairness metrics, the bias adjustment model to adjust the network operation predictive model to increase the one or more second fairness metrics generated by the algorithmic bias model;
   receiving, by the processor, an electronic request for a network operation;
   executing, by the processor, the network operation predictive model using as input at least one attribute of the electronic request for the network operation; and
   executing, by the processor, the network operation based on a prediction of the network operation predictive model.

2. The method of claim 1, wherein generating the adjusted training dataset includes removing discriminatory features from the plurality of historical network operation records.

3. The method of claim 2, wherein removing the discriminatory features from the training dataset includes screening features to include only features that correlate with target variables.

4. The method of claim 1, further comprising training the protected class demographic model by comparing an output of the protected class demographic model to actual demographic information.

5. The method of claim 1, further comprising removing, from the training dataset, overt identifiers of demographic information prior to generating the inferred protected class dataset.

6. The method of claim 1, wherein the network operation predictive model is configured to output a decision whether to extend credit to a user.

7. The method of claim 1, wherein the one or more fairness metrics include a fairness metric for a credit score for each of the historical network operation records.

8. The method of claim 1, further comprising:
   generating a second set of decision records by executing the network operation predictive model using as input a second set of network operation records;
   generating a second inferred protected class dataset by executing the protected class demographic model using as input the second set of network operation records;
   executing, by the processor, the algorithmic bias model on the second set of decision records and the second inferred protected class dataset to generate one or more second fairness metrics for the second set of decision records;
   executing, by the processor, based on the one or more second fairness metrics, the bias adjustment model using as input the second set of decision records and the second inferred protected class dataset to generate a second adjusted training dataset; and
   training the network operation predictive model using as input the second adjusted training dataset.

9. The method of claim 8, wherein the second adjusted training dataset includes one or more decision records of the second set of decision records having a fairness metric below a predetermined threshold.

10. The method of claim 8, wherein generating the second adjusted training dataset includes adjusting, based on the one or more second fairness metrics, one or more decision records of the second set of decision records.

11. A system, comprising:
   a network operation predictive model;
   a non-transitory machine-readable memory that stores a training dataset for the network operation predictive model comprised of a plurality of historical network operation records and a plurality of historical decision records each representing a decision whether to accept a respective historical network operation; and
   a processor, wherein the processor in communication with the network operation predictive model and the non-transitory, machine-readable memory executes a set of instructions instructing the processor to:

generate an inferred protected class dataset by executing the protected class demographic model using as input the plurality of historical network operation records, wherein the inferred protected class dataset identifies predicted demographic groups for the plurality of historical network operation records;

execute an algorithmic bias model using as input the plurality of historical decision records and the inferred protected class dataset to generate one or more first fairness metrics for the plurality of historical decision records;

execute, based on the one or more first fairness metrics, a bias adjustment model using as input the plurality of historical decision records and the inferred protected class dataset to generate an adjusted training dataset, wherein the adjusted training dataset includes only features correlated with target variables;

train the network operation predictive model by executing the network operation predictive model using as input the adjusted training dataset;

execute the network operation predictive model using as input a plurality of network operation records to generate a plurality of decision records;

execute the algorithmic bias model using as input the plurality of decision records to generate one or more second fairness metrics for the plurality of decision records generated by the network operation predictive model;

execute, based on the one or more second fairness metrics, the bias adjustment model to adjust the network operation predictive model to increase the one or more second fairness metrics generated by the algorithmic bias model;

receive an electronic request for a network operation;

execute the network operation predictive model using as input at least one attribute of the electronic request for the network operation; and execute the network operation based on a prediction of the network operation predictive model.

12. The system of claim 11, wherein the instructions instruct the processor to generate the adjusted training dataset includes removing discriminatory features from the plurality of historical network operation records.

13. The system of claim 12, wherein the instructions instruct the processor to remove the discriminatory features from the training dataset includes screening features to include only features that correlate with target variables.

14. The system of claim 11, wherein the instructions instruct the processor to train the protected class demographic model by comparing an output of the protected class demographic model to actual demographic information.

15. The system of claim 11, wherein the instructions instruct the processor to remove, from the training dataset, overt identifiers of demographic information prior to generating the inferred protected class dataset.

16. The system of claim 11, wherein the network operation predictive model is configured to output a decision whether to extend credit to a user.

17. The system of claim 11, wherein the one or more fairness metrics include a fairness metric for a credit score for each of the historical network operation records.

18. The system of claim 11, wherein the instructions instruct the processor to:

generate a second set of decision records by executing the network operation predictive model using as input a second set of network operation records;

generate a second inferred protected class dataset by executing the protected class demographic model using as input the second set of network operation records;

execute the algorithmic bias model on the second set of decision records and the second inferred protected class dataset to generate one or more second fairness metrics for the second set of decision records;

execute based on the one or more second fairness metrics, the bias adjustment model using as input the second set of decision records and the second inferred protected class dataset to generate a second adjusted training dataset; and train the network operation predictive model using as input the second adjusted training dataset.

19. The system of claim 18, wherein the second adjusted training dataset includes one or more decision records of the second set of decision records having a fairness metric below a predetermined threshold.

20. The system of claim 18, wherein the instructions instruct the processor to generate the second adjusted training dataset by adjusting, based on the one or more second fairness metrics, one or more decision records of the second set of decision records.

* * * * *